(12) United States Patent
Jiang et al.

(10) Patent No.: US 12,184,340 B2
(45) Date of Patent: Dec. 31, 2024

(54) UNDETERMINED TERMINAL-BASED ACCELERATED JOINT QUANTUM REMOTE STATE PREPARATION METHOD

(71) Applicant: SOOCHOW UNIVERSITY, Suzhou (CN)

(72) Inventors: Min Jiang, Suzhou (CN); Zongyi Li, Suzhou (CN); Qing Li, Suzhou (CN); Taichao Li, Suzhou (CN); Bin Sun, Suzhou (CN); Ao Wang, Suzhou (CN); Tianyu Miao, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/801,076

(22) PCT Filed: Dec. 16, 2021

(86) PCT No.: PCT/CN2021/138678
§ 371 (c)(1),
(2) Date: Aug. 19, 2022

(87) PCT Pub. No.: WO2022/183809
PCT Pub. Date: Sep. 9, 2022

(65) Prior Publication Data
US 2024/0204884 A1    Jun. 20, 2024

(30) Foreign Application Priority Data
Mar. 5, 2021    (CN) .......................... 202110246788.4

(51) Int. Cl.
*H04B 10/70* (2013.01)

(52) U.S. Cl.
CPC .................................. *H04B 10/70* (2013.01)

(58) Field of Classification Search
CPC ........ H04B 10/70; G06N 10/00; G06N 20/00; H04L 9/0852
See application file for complete search history.

(56) References Cited

FOREIGN PATENT DOCUMENTS

| CN | 103618695 A | * | 3/2014 |
| CN | 109286446 A | | 1/2019 |

(Continued)

*Primary Examiner* — Pranesh K Barua
(74) *Attorney, Agent, or Firm* — SZDC Law PC

(57) ABSTRACT

The invention provides an undetermined terminal-based accelerated joint quantum remote state preparation method, including: determining chain channels between at least two sending terminals and a receiving terminal edge node, and determining GHZ channels between the receiving terminal edge node and a plurality of candidate receiving terminals; jointly preparing, by the at least two sending terminals together, to-be-transferred information for the receiving terminal edge node; and sending, by the receiving terminal edge node, the to-be-transferred information to the plurality of candidate receiving terminals, after a target receiving terminal is determined, performing, by the other candidate receiving terminals, a measurement operation, and performing, by the target receiving terminal, corresponding unitary transformation to recover the to-be-transferred information. Information transfer efficiency and information security are greatly improved, thereby resolving a current problem that a terminal lacks a scheme of remotely preparing a quantum state in a case that a receiving terminal is indefinite.

9 Claims, 2 Drawing Sheets determining chain channels between the at least two sending terminals and the receiving terminal edge node, and determining GHZ channels between the receiving terminal edge node and the plurality of candidate receiving terminals.    S100 jointly preparing, by the at least two sending terminals together, to-be-transferred information for the receiving terminal edge node, wherein the to-be-transferred information is shared together by the at least two sending terminals, and receiving, by the receiving terminal edge node, the to-be-transferred information.    S200 sending, by the receiving terminal edge node, the to-be-transferred information to the plurality of candidate receiving terminals, determining a target receiving terminal in the plurality of candidate receiving terminals, performing, by the other candidate receiving terminals, a measurement operation, and performing, by the target receiving terminal, corresponding unitary transformation to recover the to-be-transferred information.    S300

(56) References Cited

FOREIGN PATENT DOCUMENTS

| | | | | |
|---|---|---|---|---|
| CN | 110212978 A | * | 9/2019 | ......... H04B 10/0795 |
| CN | 112804009 A | | 5/2021 | |
| WO | 2019183602 A1 | | 9/2019 | |

* cited by examiner

UNDETERMINED TERMINAL-BASED ACCELERATED JOINT QUANTUM REMOTE STATE PREPARATION METHOD

This application is the National Stage Application of PCT/CN2021/138678, filed on Dec. 16, 2021, which claims priority to Chinese Patent Application No. 202110246788.4, filed on Mar. 5, 2021, which is incorporated by reference for all purposes as if fully set forth herein.

FIELD OF THE INVENTION

The present invention relates to the fields of communication networks and information propagation technologies, and in particular, to an undetermined terminal-based accelerated joint quantum remote state preparation method.

DESCRIPTION OF THE RELATED ART

Remote quantum state preparation is the successful implementation of transferring a known quantum state based on classical information and entangled states. In 2000, Lo[6], Pati[7], and Bennett[8] et al. proposed a remote preparation scheme of known quantum states. A teleportation scheme has many similarities to the remote preparation scheme, but the information about a quantum state to be transmitted in the former is unknown, which is completely different from the latter. In the remote state preparation scheme, the precondition is that a sender knows the information about a quantum state to be transmitted. Therefore, the scheme is also called "quantum teleportation of a known state". The basic idea of the remote state preparation is that Alice, the sender, and Bob, the receiver, first share entanglement resources, and then Alice performs some classical information and local operations to implement the transmission of a quantum state that is completely known to Alice but unknown to Bob.

Current remote quantum state preparation schemes are all based on the condition that a sending terminal and a receiving terminal are determined, and there is a lack of a remote quantum state preparation scheme in a case that a receiving terminal is indefinite.

SUMMARY OF THE INVENTION

For this, a technical problem to be resolved by the present invention is to overcome the problem in the prior art that there is a lack of a remote quantum state preparation scheme in a case that a receiving terminal is indefinite.

To resolve the foregoing technical problems, a first aspect of the present invention provides an undetermined terminal-based accelerated joint quantum remote state preparation method implemented by a system. The system includes at least two sending terminals, a receiving terminal edge node, and a plurality of candidate receiving terminals. The method includes:
  determining chain channels between the at least two sending terminals and the receiving terminal edge node, and determining GHZ channels between the receiving terminal edge node and the plurality of candidate receiving terminals;
  jointly preparing, by the at least two sending terminals together, to-be-transferred information for the receiving terminal edge node, where the to-be-transferred information is shared together by the at least two sending terminals, and receiving, by the receiving terminal edge node, the to-be-transferred information; and
  sending, by the receiving terminal edge node, the to-be-transferred information to the plurality of candidate receiving terminals, determining a target receiving terminal in the plurality of candidate receiving terminals, performing, by the other candidate receiving terminals, a measurement operation, and performing, by the target receiving terminal, corresponding unitary transformation to recover the to-be-transferred information.

In a preferred technical solution, the determining chain channels between the at least two sending terminals and the receiving terminal edge node includes:
  connecting the at least two sending terminals and the receiving terminal edge node by Bell channels, and determining quantum entangled channels between the at least two sending terminals and the receiving terminal edge node by using an intermediate node measurement operation.

In a preferred technical solution, the determining GHZ channels between the receiving terminal edge node and the plurality of candidate receiving terminals includes:
  converting Bell channels between the receiving terminal edge node and the plurality of candidate receiving terminals into multi-particle state GHZ channels between the receiving terminal edge node and the plurality of candidate receiving terminals.

In a preferred technical solution, the jointly preparing, by the at least two sending terminals together, to-be-transferred information for the receiving terminal edge node, where the to-be-transferred information is shared together by the at least two sending terminals includes:
  introducing an auxiliary particle $|0\rangle_b$ into one of the sending terminals, performing a CNOT operation on particles (1, b), and sending the auxiliary particle $|0\rangle_b$ to the other sending terminal; and separately selecting, by the at least two sending terminals, corresponding amplitude measurement bases and phase measurement bases according to a part of the to-be-transferred information shared by the at least two sending terminals, and jointly preparing the to-be-transferred information for the receiving terminal edge node together.

In a preferred technical solution, the separately selecting, by the at least two sending terminals, corresponding amplitude measurement bases and phase measurement bases according to a part of the to-be-transferred information shared by the at least two sending terminals, and jointly preparing the to-be-transferred information for the receiving terminal edge node together includes:
  selecting, by one of the sending terminals, an amplitude measurement basis $\{|P_m\rangle;\ m\in\{0,1\}\}$ ($|P_0\rangle = a_0|0\rangle + a_1|1\rangle$ and $|P_1\rangle = a_1|0\rangle - a_0|1\rangle$) according to a part of the to-be-transferred information shared by the sending terminal, and selecting, by the other sending terminal, a phase measurement basis $\{O_n^{(m)}\rangle;\ m,n\in\{0,1\}\}$ in the form of $$\begin{pmatrix} |O_0^{(m)}\rangle \\ |O_1^{(m)}\rangle \end{pmatrix} = V^{(m)} \begin{pmatrix} |0\rangle \\ |1\rangle \end{pmatrix}$$

according to a part of the to-be-transferred information shared by the sending terminal, where $$V^{(0)} = \frac{1}{\sqrt{2}} \begin{pmatrix} e^{-i\theta_0} & e^{-i\theta_1} \\ e^{-i\theta_0} & -e^{-i\theta_1} \end{pmatrix} \text{ and } V^{(1)} = \frac{1}{\sqrt{2}} \begin{pmatrix} e^{-i\theta_1} & e^{-i\theta_0} \\ -e^{-i\theta_1} & e^{-i\theta_0} \end{pmatrix},$$

and a quantum state is:

$$|GHZ\rangle_{1,b,2p} = \frac{1}{\sqrt{2}} \sum_{m=0}^{1} |P_m\rangle_1 |Q_m\rangle_{b,t'} =$$

$$\frac{1}{2} \begin{pmatrix} |P_0\rangle_1 [|O_0^{(0)}\rangle_b R_0^{(0)} |\varphi\rangle_{t'} + |O_1^{(0)}\rangle_b R_1^{(0)} |\varphi\rangle_{t'}] + \\ |P_1\rangle_1 [|O_0^{(1)}\rangle_b R_0^{(1)} |\varphi\rangle_{t'} + |O_1^{(1)}\rangle_b R_1^{(1)} |\varphi\rangle_{t'}] \end{pmatrix}$$

where $R_n^{(m)}$ in the formula is a unitary operation, $R_0^{(0)}=I$, $R_1^{(0)}=\sigma_z$, $R_0^{(1)}=-\sigma_z\sigma_x$, and $R_1^{(1)}=-\sigma_x$.

In a preferred technical solution, when measurement results of one of the sending terminals for the particles are $|P_0\rangle_1$ and $|P_1\rangle_1$, states of the particles are converted into $|Q_0\rangle_{b,4}$ and $|Q_1\rangle_{b,4}$; and the other sending terminal then measures the particles, and sends measurement results to the receiving terminal edge node, and the receiving terminal edge node performs a unitary operation to recover the to-be-transferred information.

In a preferred technical solution, the determining a target receiving terminal in the plurality of candidate receiving terminals, performing, by the other candidate receiving terminals, a measurement operation, and performing, by the target receiving terminal, corresponding unitary transformation to recover the to-be-transferred information includes:

performing, by the receiving terminal edge node, Bell measurement on particles, to obtain a first measurement result, and sending the first measurement result to a target candidate receiving terminal;

after the target receiving terminal is determined from the plurality of candidate receiving terminals, performing, by the other candidate receiving terminals, H transform and basis measurement on respective particles, to obtain a second measurement result, and sending the second measurement result to the target receiving terminal; and performing, by the target receiving terminal, corresponding unitary transformation according to the first measurement result and the second measurement result, to recover the to-be-transferred information.

In a preferred technical solution, entangled states between the receiving terminal edge node and the plurality of candidate receiving terminals are as follows:

$$|\zeta\rangle = (a_0 e^{i\theta_0}|0\rangle + a_1 e^{i\theta_1}|1\rangle)_i \otimes (|00L\ 0\rangle + |11L\ 1\rangle)_{a_1 c_1 c_2 L c_N} =$$

$$(|00\rangle \pm |11\rangle)_{t',a_1} [a_0 e^{i\theta_0}|00L\ 0\rangle_{c_1 c_2 L c_N} \pm a_1 e^{i\theta_1}|11L\ 1\rangle_{c_1 c_2 L c_N}] +$$

$$(|01\rangle \pm |10\rangle)_{t',a_1} [a_0 e^{i\theta_0}|11L\ 1\rangle_{c_1 c_2 L c_N} \pm a_1 e^{i\theta_1}|00L\ 0\rangle_{c_1 c_2 L c_N}] =$$

$$(|00\rangle \pm |11\rangle)_{t',a_1} \begin{bmatrix} \sum_{K=0}^{N-1} |\{K\}\rangle_{c_2 L c_N}(a_0 e^{i\theta_0}|0\rangle \pm a_1 e^{i\theta_1}|1\rangle)_{c_1} + \\ \sum_{K=0}^{N-1} |\overline{\{K\}}\rangle_{c_2 L c_N}(a_0 e^{i\theta_0}|0\rangle m a_1 e^{i\theta_1}|1\rangle)_{c_1} \end{bmatrix} +$$

$$(|01\rangle \pm |10\rangle)_{t',a_1} \begin{bmatrix} \sum_{K=0}^{N-1} |\{K\}\rangle_{c_2 L c_N}(a_0 e^{i\theta_0}|1\rangle \pm a_1 e^{i\theta_1}|0\rangle)_{c_1} - \\ \sum_{K=0}^{N-1} |\overline{\{K\}}\rangle_{c_2 L c_N}(a_0 e^{i\theta_0}|1\rangle m a_1 e^{i\theta_1}|0\rangle)_{c_1} \end{bmatrix}$$

where in the formula, $\{K\}$ is a binary sequence of 0s and 1s, and includes an even-numbered quantity of 1s; and $\overline{\{K\}}$ includes an odd-numbered quantity of 1s.

A second aspect of the present invention provides an undetermined terminal-based accelerated joint quantum remote state preparation method performed by a sending terminal, including:

determining chain channels between at least two sending terminals and a receiving terminal edge node; and jointly preparing, by the at least two sending terminals that share to-be-transferred information together, the to-be-transferred information for the receiving terminal edge node together, sending, by the receiving terminal edge node, the to-be-transferred information to a plurality of candidate receiving terminals, and after a target receiving terminal is determined, recovering, by the other candidate receiving terminals and the target receiving terminal, the to-be-transferred information shared together by the at least two sending terminals.

A third aspect of the present invention provides an undetermined terminal-based accelerated joint quantum remote state preparation method performed by a receiving terminal edge node, including:

determining GHZ channels between the receiving terminal edge node and a plurality of candidate receiving terminals; and jointly preparing, by the receiving terminal edge node and at least two sending terminals that share to-be-transferred information together, the to-be-transferred information, receiving the to-be-transferred information, sending the to-be-transferred information to the plurality of candidate receiving terminals, and after a target receiving terminal is determined, recovering, by the other candidate receiving terminals and the target receiving terminal, the to-be-transferred information shared together by the at least two sending terminals.

Beneficial effects of the present invention are as follows: In the present invention, in a case that a receiving terminal is undetermined, a scheme of joint remote state preparation and a scheme of selecting a candidate receiving terminal are simultaneously implemented, so that information transfer efficiency and information security are greatly improved, thereby resolving a current problem that a carrier terminal lacks a scheme of remotely preparing a quantum state in a case that a receiving terminal is indefinite.

BRIEF DESCRIPTION OF THE DRAWINGS

To make the content of the present invention clearer and more comprehensible, the present invention is further described in detail below according to specific embodiments of the present invention and the accompanying draws. Where.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Before the content of the present invention is introduced, several technical nouns in the present application are first described. Details are as follows:

1. Path Selection

In path selection, it is set that the form of a Bell state $$\frac{1}{\sqrt{2}}(|00\rangle+|11\rangle)$$

is used between two adjacent links.

2. Hadamard Gate

A Hadamard gate is also referred to as H transform. The function of the Hadamard gate may be represented as follows:

$$H = \frac{1}{\sqrt{2}}[(|0\rangle+|1\rangle)\langle 0|+(|0\rangle-|1\rangle)\langle 1|]$$
$$= \frac{1}{\sqrt{2}}\begin{pmatrix} 1 & 1 \\ 1 & -1 \end{pmatrix}.$$

The operation on a single bit in the Hadamard gate is expressed as follows:

$$H|0\rangle = \frac{1}{\sqrt{2}}(|0\rangle+|1\rangle)$$
$$H|1\rangle = \frac{1}{\sqrt{2}}(|0\rangle-|1\rangle).$$

3. Bell Basis

A Bell basis is a maximum entangled state formed by two particles, and forms a group of complete orthogonal basis of a four-dimensional Hilbert space. A specific form is as follows:

$$|\phi_{00}\rangle = \frac{1}{\sqrt{2}}(|00\rangle+|11\rangle),$$
$$|\phi_{01}\rangle = \frac{1}{\sqrt{2}}(|00\rangle-|11\rangle),$$
$$|\phi_{10}\rangle = \frac{1}{\sqrt{2}}(|01\rangle+|10\rangle),$$
$$|\phi_{11}\rangle = \frac{1}{\sqrt{2}}(|01\rangle-|10\rangle).$$

4. Quantum Controlled NOT Gate

A quantum controlled-NOT gate (or a CNOT gate) has two input quantum bits, namely, a control quantum bit and a target quantum bit. The function of the CNOT gate is: when the control quantum bit is $|0\rangle$, the state of the target quantum bit does not change, and when the control quantum bit is $|1\rangle$, the state of the target bit is inverted. A matrix form corresponding to the CNOT gate is:

$$C_{NOT} = \begin{bmatrix} 1 & 0 & 0 & 0 \\ 0 & 1 & 0 & 0 \\ 0 & 0 & 0 & 1 \\ 0 & 0 & 1 & 0 \end{bmatrix}.$$

5. H Measurement

In H measurement, a to-be-tested particle first passes through one Hadamard gate, and a measurement is then performed on the to-be-tested particle on the basis $|0\rangle$, $|1\rangle$.

6. Pauli Matrix

Some unitary matrices, that is, Pauli matrices, are further used in the present invention. A specific form is as follows:

$$I = |0\rangle\langle 0| + |1\rangle\langle 1| = \begin{pmatrix} 1 & 0 \\ 0 & 1 \end{pmatrix}, X = |0\rangle\langle 1| + |1\rangle\langle 0| = \begin{pmatrix} 0 & 1 \\ 1 & 0 \end{pmatrix},$$
$$Y = |0\rangle\langle 1| - |1\rangle\langle 0| = \begin{pmatrix} 0 & 1 \\ -1 & 0 \end{pmatrix}, Z = |0\rangle\langle 0| - |1\rangle\langle 1| = \begin{pmatrix} 1 & 0 \\ 0 & -1 \end{pmatrix}.$$

Figure 1:
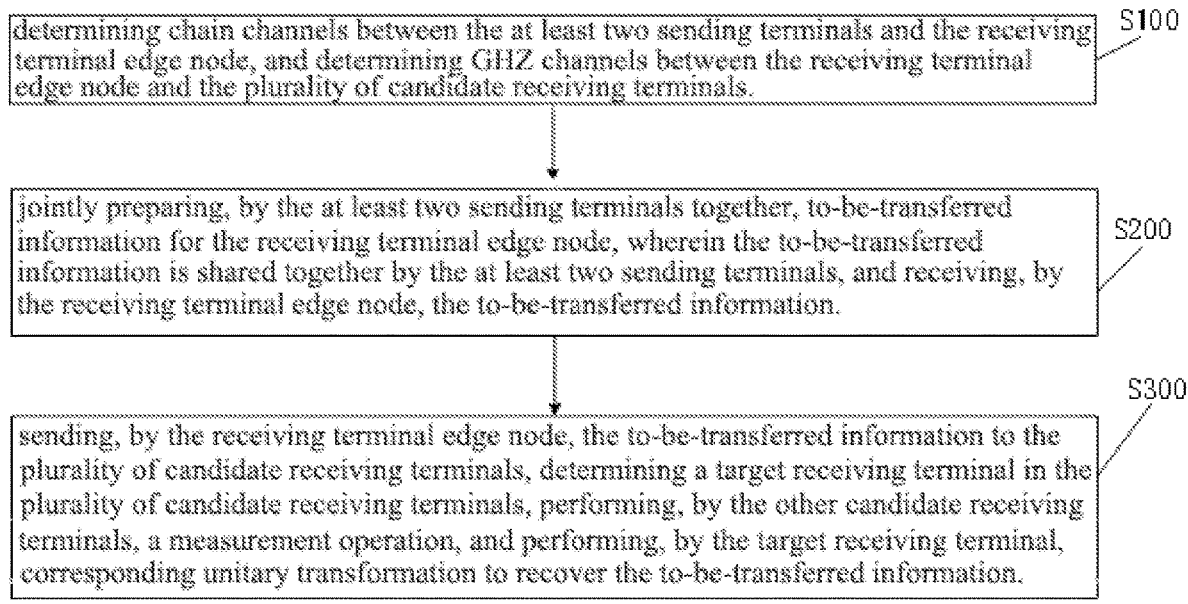
FIG. 1 is a flowchart of an undetermined terminal-based accelerated joint quantum remote state preparation method according to the present invention.

Referring to FIG. 1, an undetermined terminal-based accelerated joint quantum remote state preparation method of the present invention includes the following steps.

Step S100: Determine chain channels between the at least two sending terminals and the receiving terminal edge node, and determine GHZ channels between the receiving terminal edge node and the plurality of candidate receiving terminals.

For example, an entire network includes terminal users and one intermediate backbone network. The terminal users include a sending terminal and a receiving terminal. The intermediate backbone network includes network edge nodes and t network intermediate nodes. The network edge nodes include a sending terminal edge node and a receiving terminal edge node. In this accelerated preparation scheme, the sending terminal and the receiving terminal edge node are connected by Bell channels between t backbone network intermediate nodes, and a direct entangled channel is recovered through the measurement of the intermediate nodes. Multi-particle state GHZ channels are formed between the receiving terminal edge node and the plurality of candidate receiving terminals through a corresponding CNOT operation.

Step S200: The at least two sending terminals together jointly prepare to-be-transferred information for the receiving terminal edge node, where the to-be-transferred information is shared together by the at least two sending terminals, and the receiving terminal edge node receives the to-be-transferred information.

For example, an auxiliary particle $|0\rangle_b$ is introduced into one of the sending terminals, a CNOT operation is performed on particles (1, b), and the auxiliary particle $|0\rangle_b$ is sent to the other sending terminal. The at least two sending terminals separately select corresponding amplitude measurement bases and phase measurement bases according to a part of the to-be-transferred information shared by the at least two sending terminals, and jointly prepare the to-be-transferred information for the receiving terminal edge node together. Specifically, when measurement results of one of the sending terminals for the particles are $|P_0\rangle_1$ and $|P_1\rangle_1$, states of the particles are converted into $|Q_0\rangle_{b,4}$ and $|Q_1\rangle_{b,4}$; and the other sending terminal then measures the particles, and sends measurement results to the receiving terminal edge node, and the receiving terminal edge node performs a unitary operation to recover the to-be-transferred information.

Step S300: The receiving terminal edge node sends the to-be-transferred information to the plurality of candidate receiving terminals, and determines a target receiving terminal in the plurality of candidate receiving terminals, the other candidate receiving terminals perform a measurement operation, and the target receiving terminal performs corresponding unitary transformation to recover the to-be-transferred information.

For example, the receiving terminal edge node performs Bell measurement on particles, to obtain a first measurement result, and sends the first measurement result to the plurality of candidate receiving terminals. After the target receiving terminal is determined from the plurality of candidate receiving terminals, H transform and basis measurement are performed on the other candidate receiving terminals, to obtain a second measurement result, and the second measurement result is sent to the target receiving terminal. The target receiving terminal performs corresponding unitary transformation according to the first measurement result and the second measurement result, to recover the to-be-transferred information.

In summary, in the present invention, in a case that a receiving terminal is undetermined, a scheme of joint remote state preparation and a scheme of selecting a candidate receiving terminal are simultaneously implemented, so that information transfer efficiency and information security are greatly improved, thereby resolving a current problem that a carrier terminal lacks a scheme of remotely preparing a quantum state in a case that a receiving terminal is indefinite.

Figure 2:
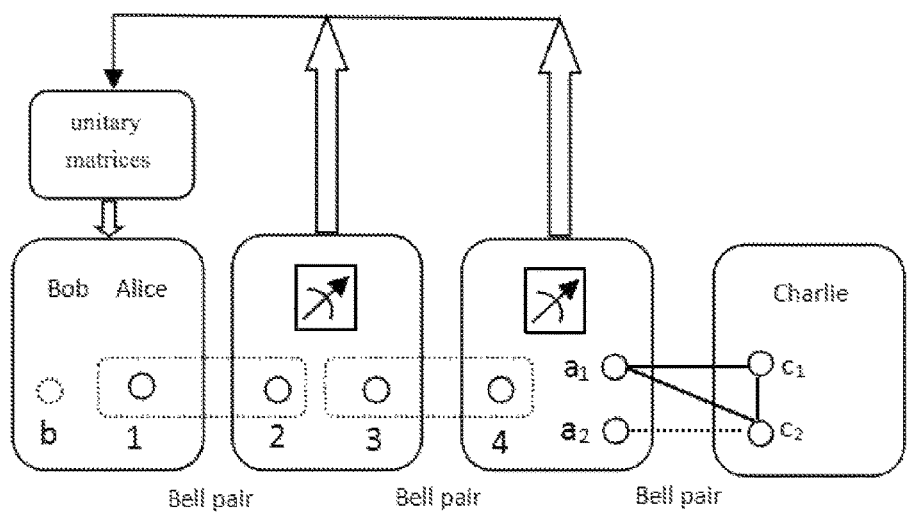
FIG. 2 is a schematic diagram of establishing a quantum channel between only two unknown terminal particles in terminal users Alice and Bob to perform communication according to an embodiment.
Figure 3:
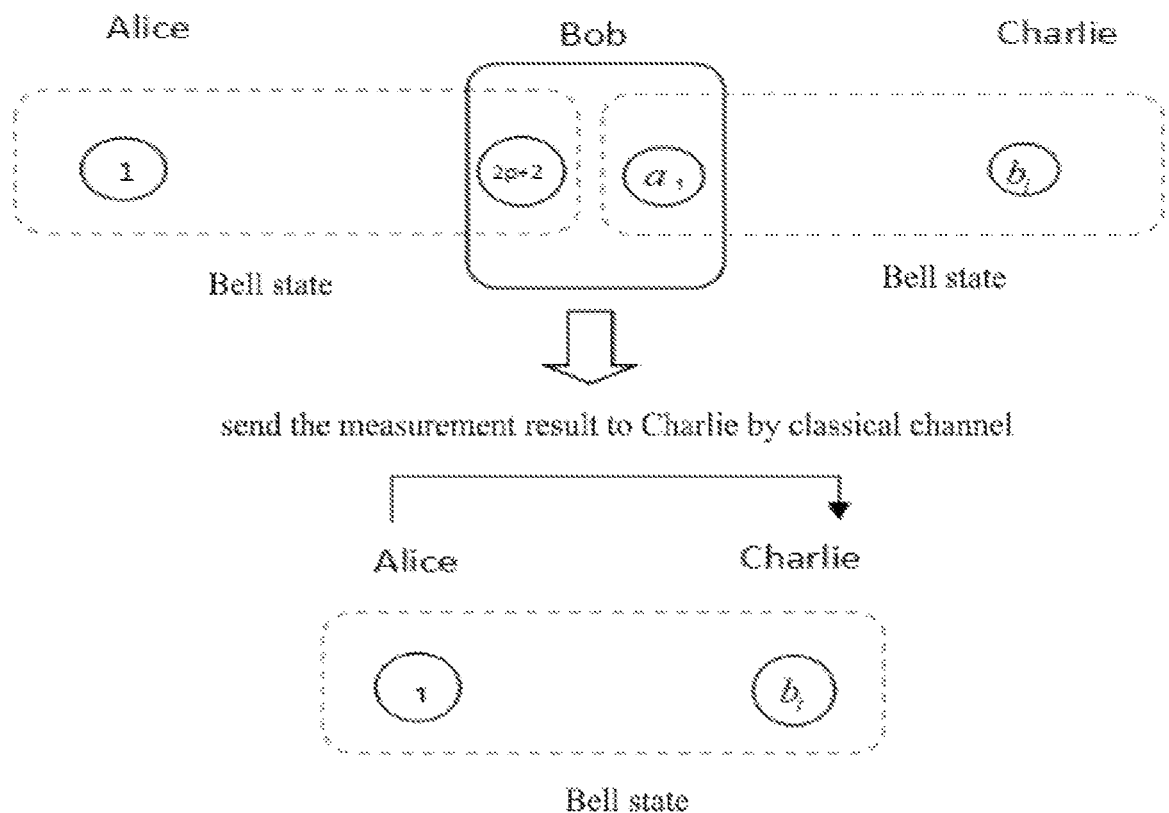
FIG. 3 is a schematic diagram of an undetermined terminal-based accelerated joint quantum remote state preparation method according to an embodiment of the present invention.

Referring to FIG. 2 and FIG. 3, an undetermined terminal-based accelerated joint quantum remote state preparation method of the present invention is described below in detail through the embodiments. In this embodiment, two candidate receiving users and two intermediate nodes with undetermined terminals are used as an example. It is implemented that terminal users Alice and Bob transfer known quantum state information to another terminal user Charlie. In a transfer process, Alice and Bob help a receiving user edge node to remotely prepare a target state: $|\varphi\rangle = a_0 e^{i\theta_0}|0\rangle + a_1 e^{i\theta_1}|1\rangle$, where $a_0, a_1 \in R$, $|a_0|^2 + |a_1|^2 = 1$, and $\theta_0, \theta_1 \in [0, 2\pi]$.

The terminal users include sending users Alice and Bob and a receiving user Charlie. An intermediate backbone network includes network edge nodes and two network intermediate nodes. The network edge nodes include a sending user edge node and a receiving user edge node.

Because this embodiment is about two candidate receiving users, the receiving user edge node includes particles @1, @2, the two candidate receiving users include particles $c_1, c_2$, and there are a Bell channel between $a_1$ and $c_1$ and a Bell channel between $a_2$ and $c_2$. The sending user Alice has a particle 1, the receiving user edge node has a particle 4, and the intermediate nodes have particles 2 and 3.

Specifically, an undetermined terminal-based accelerated joint quantum remote state preparation method includes the following steps.

Step 1: Entangle the two Bell channels between the receiving user edge node and the two candidate receiving users $c_1, c_2$, which may be represented as:

$$|\varphi\rangle = \frac{1}{\sqrt{2}}(|00\rangle+|11\rangle)_{a_1c_1} \otimes \frac{1}{\sqrt{2}}(|00\rangle+|11\rangle)_{a_2c_2} = \quad (1)$$

$$\frac{1}{2}[|0\rangle_{a_2}(|000\rangle+|111\rangle)_{a_1c_1c_2} + |1\rangle_{a_2}(|001\rangle+|110\rangle)_{a_1c_1c_2}].$$

The receiving user edge node performs a CNOT operation on the particles ($a_1, a_2$), where $a_1$ is a control quantum bit, and $a_2$ is a target quantum bit.

The receiving user edge node measures the base $\{|0\rangle, |1\rangle\}$ of the particle $a_2$. When a measurement result of the particle $a_2$ is $|0\rangle$, a receiving user performs an I operation on the corresponding particle $c_2$. When the measurement result of the particle $a_2$ by the receiving user edge node is $|1\rangle$, the receiving user performs an X operation on the corresponding particle $c_2$. Therefore, the original two mixed Bell channels may be converted into a corresponding GHZ state, as shown in the following formula:

$$|\xi'\rangle = (|000\rangle + |111\rangle)_{a_1c_1c_2} \quad (2).$$

Step 2: In a transmission path, connect the sending user, the receiving user edge node, and the two intermediate nodes to each other two by two, where the sending user and the nodes share one two-bit maximum entangled Bell state, $$|\varphi\rangle = \frac{1}{\sqrt{2}}(|00\rangle+|11\rangle)_{12} \otimes \frac{1}{\sqrt{2}}(|00\rangle+|11\rangle)_{34} = \quad (3)$$

$$\frac{1}{2}\sum_{m_1n_1=0}^{1}|\varphi_{m_1n_1}\rangle_{23} U_{m_1n_1} \otimes \frac{1}{\sqrt{2}}(|00\rangle+|11\rangle)_{14},$$

where $U_{m_1n_1}$ is a corresponding unitary operation, $U_{00}=I_4$, $U_{01}=Z_4$, $U_{10}=X_4$, and $U_{11}=Z_4X_4$.

Therefore, the intermediate nodes perform a bell measurement on the particles (2, 3) of the intermediate nodes, and send a measurement result to the receiving user edge node. If the measurement result of the intermediate nodes is $|\varphi_{m_1n_1}\rangle$, the receiving user edge node performs an $U_{m_1n_1}$ operation. Finally, a direct quantum entangled channel is established between Alice and the receiving user edge node.

Specifically, if the result of the bell measurement of the particles (2, 3) by the intermediate nodes is $$|\phi_{00}\rangle = \frac{1}{\sqrt{2}}(|00\rangle + |11\rangle),$$

and is sent to the receiving user edge node. The receiving user edge node performs a unitary operation $U_{00}=I$ on the particle 4. Other measurement operations are similar.

Finally, the channel between the sending user Alice and the receiving user edge node is converted into:

$$\frac{1}{\sqrt{2}}(|00\rangle + |11\rangle)_{1,4}. \quad (5)$$

Step 2.1: Preprocess the channel first, where the sending user Alice adds an auxiliary particle $|0\rangle_b$ to convert the original channel into:

$$\frac{1}{\sqrt{2}}(|000\rangle + |110\rangle)_{1,4,b}. \quad (6)$$

A CNOT operation is then performed on a particle pair (1, b). The particle 1 is a control quantum bit, the particle b is a controlled quantum bit, the operated particle b is sent to Bob for management, and the original channel is converted into:

$$\frac{1}{\sqrt{2}}(|000\rangle+|111\rangle)_{1,4,b}. \quad (7)$$

The sending users Alice and Bob jointly prepare to-be-transferred information for the receiving user edge node together. To obtain amplitude information, Alice selects a corresponding amplitude measurement basis $\{|P_m\rangle ; m\in \{0, 1\}\}$ and $(|P_0\rangle =a_0|0\rangle +a_1|1\rangle , |P_1\rangle =a_1|0\rangle -a_0|1\rangle )$ according to information that Alice possesses. To obtain phase information, Bob selects a corresponding phase measurement basis $\{|O_n^{(m)}\rangle ; m, n\in \{0,1\}\}$ in the form of $$\begin{pmatrix}|O_0^{(m)}\rangle \\ |O_1^{(m)}\rangle\end{pmatrix} = V^{(m)}\begin{pmatrix}|0\rangle \\ |1\rangle\end{pmatrix},$$

$$\left(V^{(0)} = \frac{1}{\sqrt{2}}\begin{pmatrix}e^{-i\theta_0} & e^{-i\theta_1} \\ e^{-i\theta_0} & -e^{-i\theta_1}\end{pmatrix} \text{ and } V^{(1)} = \frac{1}{\sqrt{2}}\begin{pmatrix}e^{-i\theta_1} & e^{-i\theta_0} \\ -e^{-i\theta_1} & e^{-i\theta_0}\end{pmatrix}\right)$$

according to information that Bob possesses. A quantum state may be written as:

$$|GHZ\rangle_{1,b,4} = \frac{1}{\sqrt{2}}\sum_{m=0}^{1}|P_m\rangle_1|Q_m\rangle_{b,4} = \quad (8)$$

$$\frac{1}{2}\begin{pmatrix}|P_0\rangle_1[|O_0^{(0)}\rangle_b R_0^{(0)}|\varphi\rangle_4+|O_1^{(0)}\rangle_b R_1^{(0)}|\varphi\rangle_4]+ \\ |P_1\rangle_1[|O_0^{(1)}\rangle_b R_0^{(1)}|\varphi\rangle_4+|O_1^{(1)}\rangle_b R_1^{(1)}|\varphi\rangle_4]\end{pmatrix},$$

where $R_n^{(m)}$ is a unitary operation, $R_0^{(0)}=I$, $R_1^{(0)}=\sigma_z$, $R_0^{(1)}=-\sigma_z\sigma_x$, and $R_1^{(1)}=-\sigma_x$.

As can be known from the foregoing formula, when measurement results of the particle 1 by the sending user Alice are $|P_0\rangle_1$ and $|P_1\rangle_1$, states of the particles b and 4 are respectively converted into $|Q_0\rangle_{b,4}$ and $|Q_1\rangle_{b,4}$. Bob then measures the particle b and sends a measurement result to the receiving user edge node. The receiving user edge node separately performs a unitary operation to recover the to-be-transferred information $|\phi\rangle$.

Specifically, if the measurement result of the particle 1 by the sending user Alice is $|P_0\rangle$, the particle b and the particle 4 collapse to $|Q_0\rangle$. Bob then measures b. If the measurement result is $|O_0^{(0)}\rangle$, the measurement result is sent to the receiving user edge node. The receiving user edge node performs a unitary operation $R_0^{(0)}$ to obtain the to-be-transferred information $|\phi\rangle$. If the measurement result of the particle b by Bob is $|O_1^{(0)}\rangle$, the measurement result is sent to the receiving user edge node. The receiving user edge node performs a unitary operation $R_1^{(0)}$ to obtain the to-be-transferred information $|\phi\rangle$. If the measurement result of the particle 1 by the sending user Alice is $|P_1\rangle$, the particle b and the particle 4 collapse to $|Q_1\rangle$. Bob then measures the auxiliary particle b. If the measurement result is $|O_0^{(1)}\rangle$, the measurement result is sent to the receiving user edge node. The receiving user edge node performs a unitary operation $R_0^{(1)}$ to obtain the to-be-transferred information $|\phi\rangle$. If the measurement result of the particle b by Bob is $|O_1^{(1)}\rangle$, the measurement result is sent to the receiving user edge node. The receiving user edge node performs a unitary operation $R_1^{(1)}$ to obtain the to-be-transferred information $|\phi\rangle$.

It needs to be noted that the foregoing step 1 and step 2 may be performed simultaneously.

Step 3: Establish entangled states between the receiving user edge node and the two candidate receiving users as follows:

$$|\zeta\rangle = (a_0 e^{i\theta_0}|0\rangle + a_1 e^{i\theta_1}|1\rangle)_4 \otimes (|000\rangle + |111\rangle)_{a_1 c_1 c_2} = \quad (9)$$
$$(|00\rangle \pm |11\rangle)_{4,a_1}[a_0 e^{i\theta_0}|00\rangle_{c_1 c_2} \pm a_1 e^{i\theta_1}|11\rangle_{c_1 c_2}]+$$
$$(|01\rangle \pm |10\rangle)_{4,a_1}[a_0 e^{i\theta_0}|11\rangle_{c_1 c_2} \pm a_1 e^{i\theta_1}|00\rangle_{c_1 c_2}] =$$
$$(|00\rangle \pm |11\rangle)_{4,a_1}\begin{bmatrix}|0\rangle_{c_2}(a_0 e^{i\theta_0}|0\rangle \pm a_1 e^{i\theta_1}|1\rangle)_{c_1} + \\ |1\rangle_{c_2}(a_0 e^{i\theta_0}|0\rangle \mp a_1 e^{i\theta_1}|1\rangle)_{c_1}\end{bmatrix}+$$
$$(|01\rangle \pm |10\rangle)_{4,a_1}\begin{bmatrix}|0\rangle_{c_2}(a_0 e^{i\theta_0}|1\rangle \pm a_1 e^{i\theta_1}|0\rangle)_{c_1} - \\ |1\rangle_{c_2}(a_0 e^{i\theta_0}|1\rangle \mp a_1 e^{i\theta_1}|0\rangle)_{c_1}\end{bmatrix}.$$

As can be known from the foregoing results, the receiving user edge node first selects Bell measurement bases $|00\rangle \pm |11\rangle$ and $|01\rangle \pm |10\rangle$ to measure the particle 4 and $a_1$, and sends the measurement result to the receiving user. If the determined receiving user is $c_1$, the candidate receiving user $c_2$ performs a corresponding H operation and basis measurement $\{|0\rangle , |1\rangle \}$.

In combination with the foregoing communication process, if the measurement result of the particle 1 by the sending user Alice is $|P_0\rangle$ and the measurement result of the particle b by Bob is $|O_0^{(0)}\rangle$ the measurement result is sent to the receiving user edge node. The receiving user edge node performs a unitary operation $R_0^{(0)}$ to obtain the to-be-transferred information $|\phi\rangle$. The receiving user edge node then performs a Bell measurement on the particles (4, $a_1$). If a measurement result is $|00\rangle \pm |11\rangle$ and a measurement result of a candidate receiving user $b_2$ is $|0\rangle$, the receiving user separately performs I and Z operations. If the measurement result of the candidate receiving user $b_2$ is $|1\rangle$, the receiving user separately performs Z and I operations. If the measurement result of the receiving user edge node is $|01\rangle \pm |10\rangle$ and the measurement result of the candidate receiving user $b_2$ is $|0\rangle$, the receiving user separately performs X and ZX operations. If the measurement result of the candidate receiving user $b_2$ is $|1\rangle$, the receiving user separately performs XZ and ZXZ operations to recover the to-be-transferred information $|\phi\rangle$.

If the measurement result of the particle 1 by the sending user Alice is $|P_0\rangle$ and the measurement result of the particle b by Bob is $|O_1^{(0)}\rangle$, the measurement result is sent to the receiving user edge node. The receiving user edge node performs a unitary operation $R_1^{(0)}$ to obtain the to-be-transferred information $|\phi\rangle$. The receiving user edge node then performs a Bell measurement on the particles (4, $a_1$). If a measurement result is $|00\rangle \pm |11\rangle$ and a measurement result of a candidate receiving user $b_2$ is $|0\rangle$, the receiving user separately performs I and Z operations. If the measurement result of the candidate receiving user $b_2$ is $|1\rangle$, the receiving user separately performs Z and I operations. If the measurement result of the receiving user edge node is $|01\rangle \pm |10\rangle$ and the measurement result of the candidate receiving user $b_2$ is $|0\rangle$, the receiving user separately performs X and ZX operations. If the measurement result of the candidate receiving user $b_2$ is $|1\rangle$, the receiving user separately performs XZ and ZXZ operations to recover the to-be-transferred information $|\phi\rangle$.

If the measurement result of the particle 1 by the sending user Alice is $|P_1\rangle$ and the measurement result of the particle b by Bob is $|O_0^{(1)}\rangle$, the measurement result is sent to the receiving user edge node. The receiving user edge node performs a unitary operation $R_0^{(1)}$ to obtain the to-betransferred information $|\phi\rangle$. The receiving user edge node then performs a Bell measurement on a particle pair (4, $a_1$). If a measurement result is $|00\rangle \pm |11\rangle$ and a measurement result of a candidate receiving user $b_2$ is $|0\rangle$, the receiving user separately performs I and Z operations. If the measurement result of the candidate receiving user $b_2$ is $|1\rangle$, the receiving user separately performs Z and I operations. If the measurement result of the receiving user edge node is $|01\rangle \pm |10\rangle$ and the measurement result of the candidate receiving user $b_2$ is $|0\rangle$, the receiving user separately performs X and ZX operations. If the measurement result of the candidate receiving user $b_2$ is $|1\rangle$, the receiving user separately performs XZ and ZXZ operations to recover the to-be-transferred information $|\phi\rangle$.

If the measurement result of the particle 1 by the sending user Alice is $|P_1\rangle$ and the measurement result of the particle b by Bob is $|O_1^{(1)}\rangle$, the measurement result is sent to the receiving user edge node. The receiving user edge node performs a unitary operation $R_1^{(1)}$ to obtain the to-be-transferred information $|\phi\rangle$. The receiving user edge node then performs a Bell measurement on the particles (4, $a_1$). If a measurement result is $|00\rangle \pm |11\rangle$ and a measurement result of a candidate receiving user $b_2$ is $|0\rangle$, the receiving user separately performs I and Z operations. If the measurement result of the candidate receiving user $b_2$ is $|1\rangle$, the receiving user separately performs Z and I operations. If the measurement result of the receiving user edge node is $|01\rangle \pm |10\rangle$ and the measurement result of the candidate receiving user $b_2$ is $|0\rangle$, the receiving user separately performs X and ZX operations. If the measurement result of the candidate receiving user $b_2$ is $|1\rangle$, the receiving user separately performs XZ and ZXZ operations to recover the to-be-transferred information $|\phi\rangle$.

A person skilled in the art should understand that the embodiments of the present application may be provided as a method, a system or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. An undetermined terminal-based accelerated joint quantum remote state preparation method implemented by a system, wherein the system comprises at least two sending terminals, a receiving terminal edge node, and a plurality of candidate receiving terminals, and the method comprises:

determining chain channels between the at least two sending terminals and the receiving terminal edge node, and determining GHZ channels between the receiving terminal edge node and the plurality of candidate receiving terminals;

jointly preparing, by the at least two sending terminals together, to-be-transferred information for the receiving terminal edge node, wherein the to-be-transferred information is shared together by the at least two sending terminals, and receiving, by the receiving terminal edge node, the to-be-transferred information; and sending, by the receiving terminal edge node, the to-be-transferred information to the plurality of candidate receiving terminals, determining a target receiving terminal in the plurality of candidate receiving terminals, performing, by the other candidate receiving terminals, a measurement operation, and performing, by the target receiving terminal, corresponding unitary transformation to recover the to-be-transferred information, wherein the jointly preparing, by the at least two sending terminals together, to-be-transferred information for the receiving terminal edge node, wherein the to-be-transferred information is shared together by the at least two sending terminals, comprises:

introducing an auxiliary particle $\rangle$ into one of the sending terminals, performing a CNOT operation on particles (1, b), and sending the auxiliary particle $\rangle$ to the other sending terminal; and separately selecting, by the at least two sending terminals, corresponding amplitude measurement bases and phase measurement bases according to a part of the to-be-transferred information shared by the at least two sending terminals, and jointly preparing the to-be-transferred information for the receiving terminal edge node together.

2. The undetermined terminal-based accelerated joint quantum remote state preparation method implemented by a system according to claim 1, wherein the determining chain channels between the at least two sending terminals and the receiving terminal edge node comprises:
connecting the at least two sending terminals and the receiving terminal edge node by Bell channels, and determining quantum entangled channels between the at least two sending terminals and the receiving terminal edge node by using an intermediate node measurement operation.

3. The undetermined terminal-based accelerated joint quantum remote state preparation method implemented by a system according to claim 1, wherein the determining GHZ channels between the receiving terminal edge node and the plurality of candidate receiving terminals comprises:
converting Bell channels between the receiving terminal edge node and the plurality of candidate receiving terminals into multi-particle state GHZ channels between the receiving terminal edge node and the plurality of candidate receiving terminals.

4. The undetermined terminal-based accelerated joint quantum remote state preparation method implemented by a system according to claim 1, wherein the separately selecting, by the at least two sending terminals, corresponding amplitude measurement bases and phase measurement bases according to a part of the to-be-transferred information shared by the at least two sending terminals, and jointly preparing the to-be-transferred information for the receiving terminal edge node together comprises:
selecting, by one of the sending terminals, an amplitude measurement basis $\{|P_m\rangle ; m \in \{0,1\}\}$ and $(|P_0\rangle = a_0 |0\rangle + a_1 |1\rangle, |P_1\rangle = a_1 |0\rangle - a_0 |1\rangle)$ according to a part of the to-be-transferred information shared by the sending terminal, and selecting, by the other sending terminal, a phase measurement basis $\{|O_n^{(m)}\rangle ; m, n \in \{0, 1\}\}$ in the form of $$\begin{pmatrix} |O_0^{(m)}\rangle \\ |O_1^{(m)}\rangle \end{pmatrix} = V^{(m)} \begin{pmatrix} |0\rangle \\ |1\rangle \end{pmatrix}$$

according to a part of the to-be-transferred information shared by the sending terminal, wherein $$V^{(0)} = \frac{1}{\sqrt{2}} \begin{pmatrix} e^{-i\theta_0} & e^{-i\theta_1} \\ e^{-i\theta_0} & -e^{-i\theta_1} \end{pmatrix} \text{ and } V^{(1)} = \frac{1}{\sqrt{2}} \begin{pmatrix} e^{-i\theta_1} & e^{-i\theta_0} \\ -e^{-i\theta_1} & e^{-i\theta_0} \end{pmatrix},$$

and a quantum state is:

$$|GHZ\rangle_{1,b,2p} = \frac{1}{\sqrt{2}} \sum_{m=0}^{1} |P_m\rangle_1 |Q_m\rangle_{b,t'} =$$

$$\frac{1}{2} \begin{pmatrix} |P_0\rangle_1 [|O_0^{(0)}\rangle_b R_0^{(0)} |\varphi\rangle_{t'} + |O_1^{(0)}\rangle_b R_1^{(0)} |\varphi\rangle_{t'}] + \\ |P_1\rangle_1 [|O_0^{(1)}\rangle_b R_0^{(1)} |\varphi\rangle_{t'} + |O_1^{(1)}\rangle_b R_1^{(1)} |\varphi\rangle_{t'}] \end{pmatrix}$$

wherein $R_n^{(m)}$ in the formula is a unitary operation, $R_0^{(0)} = I$, $R_1^{(0)} = \sigma_z$, $R_0^{(1)} = -\sigma_z \sigma_x$, and $R_1^{(1)} = -\sigma_x$.

5. The undetermined terminal-based accelerated joint quantum remote state preparation method implemented by a system according to claim 4, wherein when measurement results of one of the sending terminals for the particles are $|P_0\rangle_1$ and $|P_1\rangle_1$, states of the particles are converted into $|Q_0\rangle_{b,4}$ and $|Q_1\rangle_{b,4}$; and the other sending terminal then measures the particles, and sends measurement results to the receiving terminal edge node, and the receiving terminal edge node performs a unitary operation to recover the to-be-transferred information.

6. The undetermined terminal-based accelerated joint quantum remote state preparation method implemented by a system according to claim 1, wherein the determining a target receiving terminal in the plurality of candidate receiving terminals, performing, by the other candidate receiving terminals, a measurement operation, and performing, by the target receiving terminal, corresponding unitary transformation to recover the to-be-transferred information comprises:
performing, by the receiving terminal edge node, Bell measurement on particles, to obtain a first measurement result, and sending the first measurement result to a target candidate receiving terminal;
after the target receiving terminal is determined from the plurality of candidate receiving terminals, performing, by the other candidate receiving terminals, H transform and basis measurement on respective particles, to obtain a second measurement result, and sending the second measurement result to the target receiving terminal; and
performing, by the target receiving terminal, corresponding unitary transformation according to the first measurement result and the second measurement result, to recover the to-be-transferred information.

7. The undetermined terminal-based accelerated joint quantum remote state preparation method implemented by a system according to claim 6, wherein entangled states between the receiving terminal edge node and the plurality of candidate receiving terminals are as follows:

$$|\zeta\rangle = (a_0 e^{i\theta_0}|0\rangle + a_1 e^{i\theta_1}|1\rangle)_{t'} \otimes (|00L\ 0\rangle + |11L\ 1\rangle)_{a_1 c_1 c_2 L c_N} =$$

$$(|00\rangle \pm |11\rangle)_{t',a_1} [a_0 e^{i\theta_0}|00L\ 0\rangle_{c_1 c_2 L c_N} \pm a_1 e^{i\theta_1}|11L\ 1\rangle_{c_1 c_2 L c_N}] +$$

$$(|01\rangle \pm |10\rangle)_{t',a_1} [a_0 e^{i\theta_0}|11L\ 1\rangle_{c_1 c_2 L c_N} \pm a_1 e^{i\theta_1}|00L\ 0\rangle_{c_1 c_2 L c_N}] =$$

$$(|00\rangle \pm |11\rangle)_{t',a_1} \begin{bmatrix} \sum_{K=0}^{N-1} |\{K\}\rangle_{c_2 L c_N} (a_0 e^{i\theta_0}|0\rangle \pm a_1 e^{i\theta_1}|1\rangle)_{c_1} + \\ \sum_{K=0}^{N-1} |\{\overline{K}\}\rangle_{c_2 L c_N} (a_0 e^{i\theta_0}|0\rangle m a_1 e^{i\theta_1}|1\rangle)_{c_1} \end{bmatrix} +$$

$$(|01\rangle \pm |10\rangle)_{t',a_1} \begin{bmatrix} \sum_{K=0}^{N-1} |\{K\}\rangle_{c_2 L c_N} (a_0 e^{i\theta_0}|1\rangle \pm a_1 e^{i\theta_1}|0\rangle)_{c_1} - \\ \sum_{K=0}^{N-1} |\{\overline{K}\}\rangle_{c_2 L c_N} (a_0 e^{i\theta_0}|1\rangle m a_1 e^{i\theta_1}|0\rangle)_{c_1} \end{bmatrix}$$

wherein in the formula, $\{K\}$ is a binary sequence of 0s and 1s, and comprises an even-numbered quantity of 1s; and $\{\overline{K}\}$ comprises an odd-numbered quantity of 1s.

8. An undetermined terminal-based accelerated joint quantum remote state preparation method performed by a sending terminal, comprising:
determining chain channels between at least two sending terminals and a receiving terminal edge node; and
jointly preparing, by the at least two sending terminals that share to-be-transferred information together, the to-be-transferred information for the receiving terminal edge node together, sending, by the receiving terminal edge node, the to-be-transferred information to a plurality of candidate receiving terminals, and after a target receiving terminal is determined, recovering, by the other candidate receiving terminals and the target receiving terminal, the to-be-transferred information shared together by the at least two sending terminals, wherein the jointly preparing, by the at least two sending terminals that share to-be-transferred information together, the to-be-transferred information for the receiving terminal edge node together, sending, by the receiving terminal edge node, the to-be-transferred information to a plurality of candidate receiving terminals, comprises:

introducing an auxiliary particle $|0\rangle_b$ into one of the sending terminals, performing a CNOT operation on particles (1, b), and sending the auxiliary particle $|0\rangle_b$ to the other sending terminal; and separately selecting, by the at least two sending terminals, corresponding amplitude measurement bases and phase measurement bases according to a part of the to-be-transferred information shared by the at least two sending terminals, and jointly preparing the to-be-transferred information for the receiving terminal edge node together.

9. An undetermined terminal-based accelerated joint quantum remote state preparation method performed by a receiving terminal edge node, comprising:

determining GHZ channels between the receiving terminal edge node and a plurality of candidate receiving terminals; and jointly preparing, by the receiving terminal edge node and at least two sending terminals that share to-be-transferred information together, the to-be-transferred information, receiving the to-be-transferred information, sending the to-be-transferred information to the plurality of candidate receiving terminals, and after a target receiving terminal is determined, recovering, by the other candidate receiving terminals and the target receiving terminal, the to-be-transferred information shared together by the at least two sending terminals, wherein the jointly preparing, by the receiving terminal edge node and at least two sending terminals that share to-be-transferred information together, the to-be-transferred information, receiving the to-be-transferred information, sending the to-be-transferred information to the plurality of candidate receiving terminals, comprises:

introducing an auxiliary particle $|0\rangle_b$ into one of the sending terminals, performing a CNOT operation on particles (1, b), and sending the auxiliary particle $|0\rangle_b$ to the other sending terminal; and separately selecting, by the at least two sending terminals, corresponding amplitude measurement bases and phase measurement bases according to a part of the to-be-transferred information shared by the at least two sending terminals, and jointly preparing the to-be-transferred information for the receiving terminal edge node together.

* * * * *